United States Patent
Mun et al.

(10) Patent No.: US 8,927,130 B2
(45) Date of Patent: Jan. 6, 2015

(54) ELECTROLYTE FOR REDOX FLOW BATTERY AND REDOX FLOW BATTERY INCLUDING THE SAME

(75) Inventors: Jun-young Mun, Seoul (KR); Seung-sik Hwang, Seongnam-si (KR); Doo-yeon Lee, Yongin-si (KR); Hyung-tae Kim, Seoul (KR); Young-gyu Kim, Gunpo-si (KR); Oh-min Kwon, Incheon (KR); Tae-eun Yim, Seoul (KR)

(73) Assignees: Samsung Electronics Co., Ltd. (KR); Seoul National University R&DB Foundation (KR)

( * ) Notice: Subject to any disclaimer, the term of this patent is extended or adjusted under 35 U.S.C. 154(b) by 330 days.

(21) Appl. No.: 13/397,852

(22) Filed: Feb. 16, 2012

(65) Prior Publication Data

US 2013/0004819 A1  Jan. 3, 2013

(30) Foreign Application Priority Data

Jun. 28, 2011 (KR) ........................ 10-2011-0063046

(51) Int. Cl.
  *H01M 6/36* (2006.01)
  *H01M 8/18* (2006.01)

(52) U.S. Cl.
  CPC ...... *H01M 8/188* (2013.01); *H01M 2300/0025* (2013.01); *H01M 2300/0082* (2013.01); *Y02E 60/528* (2013.01)

USPC .......................................... 429/108; 429/105

(58) Field of Classification Search
  USPC .................................. 429/105, 108
  See application file for complete search history.

(56) References Cited

U.S. PATENT DOCUMENTS

| | | | | |
|---|---|---|---|---|
| 4,591,453 | A * | 5/1986 | Kobayashi | 252/182.1 |
| 6,764,789 | B1 * | 7/2004 | Sekiguchi et al. | 429/105 |
| 8,481,192 | B2 * | 7/2013 | Sun et al. | 429/105 |
| 8,642,202 | B2 * | 2/2014 | Sun et al. | 429/105 |
| 2002/0018937 | A1 | 2/2002 | Noh | |
| 2006/0063065 | A1 * | 3/2006 | Clarke et al. | 429/105 |
| 2009/0017379 | A1 * | 1/2009 | Inatomi et al. | 429/213 |
| 2009/0298189 | A1 * | 12/2009 | Sundermeyer et al. | 436/161 |

FOREIGN PATENT DOCUMENTS

| | | |
|---|---|---|
| JP | 2005-108520 | 4/2005 |
| JP | 2010-086935 | 4/2010 |
| JP | 2010-170782 | 8/2010 |
| KR | 10-0337889 | 5/2002 |

OTHER PUBLICATIONS

English abstract of KR 10-2002-0003901 (Jan. 2002).

* cited by examiner

*Primary Examiner* — Jonathan Jelsma
(74) *Attorney, Agent, or Firm* — Cantor Colburn LLP

(57) ABSTRACT

An electrolyte for a redox flow battery and a redox flow battery including the electrolyte, the electrolyte including a metal-ligand coordination compound as a cation and an anion containing at least four atoms linked to each other by a straight chain in a certain direction.

14 Claims, 8 Drawing Sheets

ELECTROLYTE FOR REDOX FLOW BATTERY AND REDOX FLOW BATTERY INCLUDING THE SAME

CROSS-REFERENCE TO RELATED APPLICATION

This application claims the benefit of Korean Patent Application No. 10-2011-0063046, filed on Jun. 28, 2011 in the Korean Intellectual Property Office, the disclosure of which is incorporated herein in its entirety by reference.

BACKGROUND OF THE INVENTION

1. Field of the Invention

Aspects of the present invention relate to electrolytes for redox flow batteries and redox flow batteries including the electrolytes, and more particularly, to electrolytes for redox flow batteries having high energy density and long lifetime and redox flow batteries including the electrolytes.

2. Description of the Related Art

Secondary batteries are highly efficient energy storage systems that are widely used in small mobile phones and middle and large power storage devices. Specifically, secondary batteries are used as main core parts in semiconductor and liquid crystal devices, acoustic devices, and information and communication devices such as mobile phones and laptops. More recently, they have begun to be used as power sources in hybrid cars.

Such power storage systems require stable energy supply and high energy conversion efficiency. Recently, redox flow batteries have come into the spotlight as secondary batteries having a large capacity and high durability, which are most suitable for large-scale power storage systems.

Unlike other batteries, the active material of the redox flow batteries exists as ions in an aqueous state instead of a solid state, and the redox flow batteries have nechanisms of storing and generating electric energy according to the oxidation/reduction reaction of each ion in a cathode and an anode.

In other words, redox flow batteries include an electrolyte solution in which an active material of an electrode is dissolved in a solvent. The cathode is oxidized and the anode is reduced when a redox flow battery including a catholyte and an anolyte having different oxidation states is charged, and the electromotive force of the redox flow battery is determined by the difference between standard electrode potentials ($E^o$) of a redox couple forming the catholyte and the anolyte. In addition, the catholyte and the anolyte are supplied from respective electrolyte solution tanks by a pump. The redox flow batteries simultaneously have a quick oxidation and reduction reaction rate on the surfaces of the cathodes and anodes, like typical batteries, and have large output characteristics, like fuel cells.

Recently, to enhance the low energy density of redox flow batteries, research into a method of operating a redox flow battery at a higher voltage range by using organic-based electrolytes instead of electrochemically unstable aqueous electrolytes has been actively conducted. In this regard, the concentration of metal salts in the organic-based electrolytes directly affects the energy density of the redox flow batteries and thus it is necessary to enhance the solubility of the metal salts in an organic solvent.

SUMMARY OF THE INVENTION

Aspects of the present invention provide electrolytes for redox flow batteries, which electrolytes have high solubility of metal salts in an organic solvent.

Aspects of the present invention provide redox flow batteries with high energy density and long lifetime.

According to an aspect of the present invention, an electrolyte for a redox flow battery includes a non-aqueous solvent; a supporting electrolyte; and a metal salt, wherein the metal salt includes a metal-ligand coordination compound as a cation and an anion containing at least four atoms linked to each other by a straight chain in a certain direction.

The anion may include at least 8 atoms.

The anion may have a maximum diameter in the range of about 6 Å to about 12 Å.

The anion may be at least one of the anions represented by Formulae 1 through 4 below:

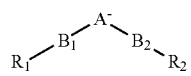

<Formula 1> wherein A is N or P;
$B_1$ and $B_2$ are each independently

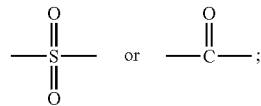

and $R_1$ and $R_2$ are each independently a halogen atom, a $C_1$-$C_5$ alkyl group, a $C_1$-$C_5$ alkyl group substituted with at least one halogen atom, a $C_6$-$C_{10}$ aryl group, a $C_6$-$C_{10}$ aryl group substituted with at least one halogen atom, or a $C_2$-$C_5$ alkenyl group; provided that the following anions are excluded: an anion according to Formula 1, wherein each of $B_1$ and $B_2$ is

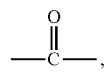

and each of $R_1$ and $R_2$ is a halogen atom,

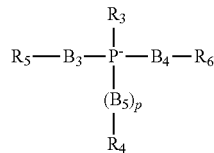

<Formula 2> wherein $B_3$ through $B_5$ are each independently

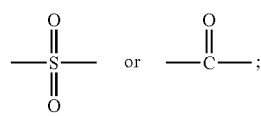

p is 0 or 1; and
$R_3$ through $R_6$ are each independently a halogen atom, a $C_1$-$C_5$ alkyl group, a $C_1$-$C_5$ alkyl group substituted with at least one halogen atom, a $C_6$-$C_{10}$ aryl group, a $C_6$-$C_{10}$ aryl group substituted with at least one halogen atom, or a $C_2$-$C_5$ alkenyl group; provided that the following anions are excluded: an anion according to Formula 2, wherein each of $B_3$ and $B_4$ is

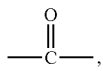, and each of $R_5$ and $R_6$ is a halogen atom,

<Formula 3>

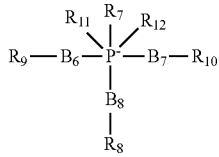

wherein $B_6$ through $B_5$ are each independently

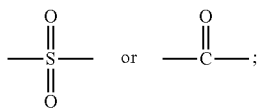

and $R_7$ through $R_{12}$ are each independently a halogen atom, a $C_1$-$C_5$ alkyl group, a $C_1$-$C_5$ alkyl group substituted with at least one halogen atom, a $C_6$-$C_{10}$ aryl group, a $C_6$-$C_{10}$ aryl group substituted with at least one halogen atom, or a $C_2$-$C_5$ alkenyl group; provided that the following anions are excluded: an anion according to Formula 3, wherein each of $B_6$ and $B_7$ is

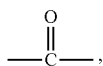, and each of $R_9$ and $R_{10}$ is a halogen atom,

<Formula 4>

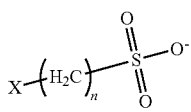

wherein n is an integer of 1 to 8, and X is a halogen atom.

The anion may be at least one selected from the group consisting of

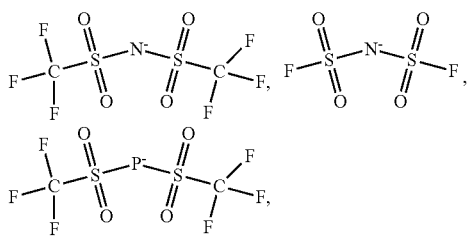

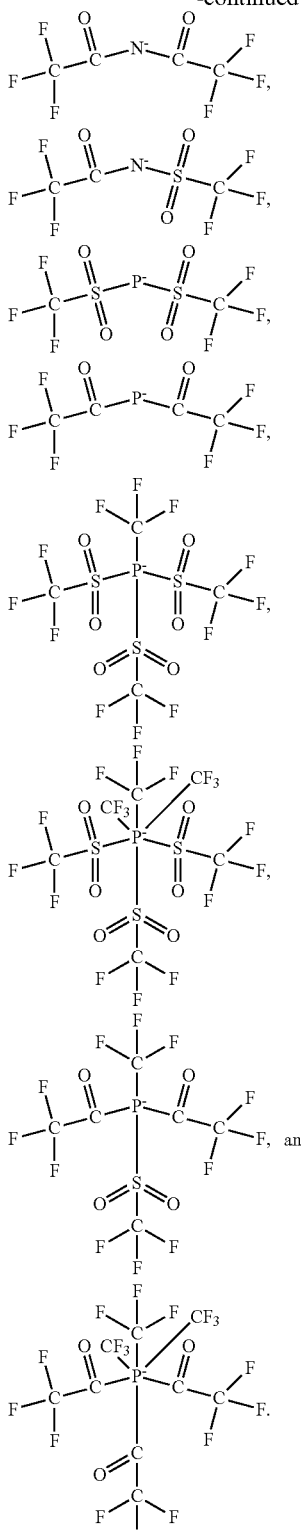

A metal in the metal-ligand coordination compound acting as a cation may be at least one selected from the group consisting of nickel (Ni), cobalt (Co), iron (Fe), ruthenium (Ru), zinc (Zn), manganese (Mn), yttrium (Y), zirconium (Zr), titanium (Ti), chromium (Cr), magnesium (Mg), cerium (Ce), copper (Cu), lead (Pb), and vanadium (V).

A ligand in the metal-ligand coordination compound acting as a cation may be at least one selected from the group consisting of dipyridyl, terpyridyl, phenanthroline, acetylacetonate, ethylenediamine, propylenediamine, and N-heterocyclic carbene (NHC).

The metal-ligand coordination compound may undergo a reversible oxidation/reduction reaction.

The metal salt may be

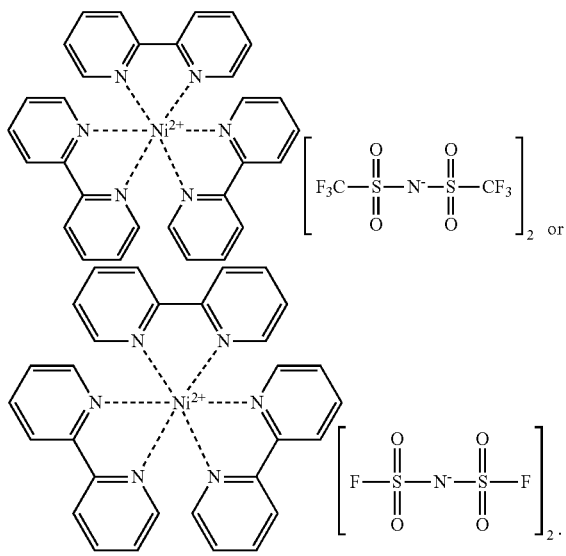

The metal salt may have a concentration in the range of about 1.2 M to about 5.0 M.

The non-aqueous solvent may be at least one selected from the group consisting of diethyl carbonate, dimethyl carbonate, acetonitrile, γ-butyrolactone (GBL), propylene carbonate (PC), ethylene carbonate (EC), N-methyl-2-pyrrolidone (NMP), fluoroethylene carbonate, and N,N-dimethylacetamide.

The supporting electrolyte may be at least one selected from the group consisting of $LiBF_4$, $LiPF_6$, $LiClO_4$, $LiCF_3SO_3$, $Li(CF_3SO_2)_2N$, tetraethylammonium tetrafluoroborate ($TEABF_4$), tetrabutylammonium tetrafluoroborate ($TBABF_4$), $NaBF_4$, $NaPF_6$, potassium bis(fluorosulfonyl) imide, methanesulfonyl chloride, and $(NH_4)_2SO_4$.

According to another aspect of the present invention, a redox flow battery includes a cathode cell including a cathode and a catholyte; an anode cell including an anode and an anolyte; and an ion exchange membrane disposed between the cathode cell and the anode cell, wherein at least one of the catholyte and the anolyte includes the electrolyte described above.

The cathode cell and the anode cell may be respectively connected to a catholyte tank and an anolyte tank to transfer a fluid.

The ion exchange membrane may be an anion exchange membrane.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1A:
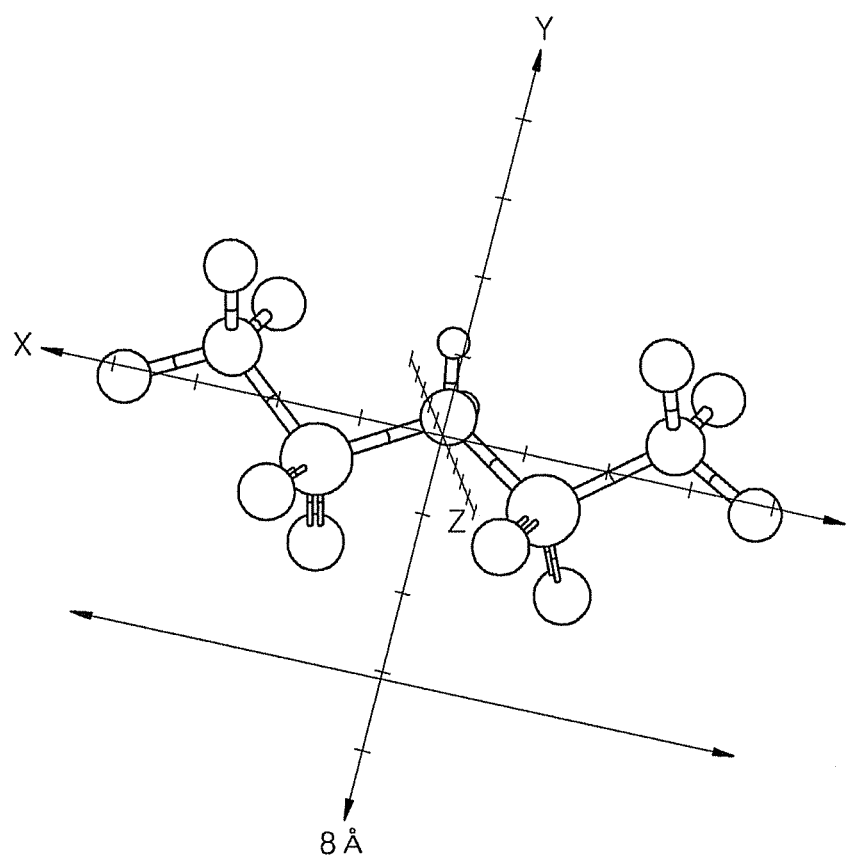
FIG. 1A illustrates a three-dimensional structure of an anion according to an embodiment.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

According to an embodiment of the present invention, an electrolyte for a redox flow battery includes a non-aqueous solvent; a supporting electrolyte; and a metal salt, wherein the metal salt includes a cation, which is a metal-ligand coordination compound, and an anion containing at least four atoms linked to each other by a straight chain in a certain direction.

The electrolyte for a redox flow battery is used as a catholyte and an anolyte, and the catholyte and the anolyte act as an electrode active material.

A redox flow battery including such a catholyte and anolyte is discharged by connecting the redox flow battery to an external circuit including an electric load and supplying a current to the external circuit. In the other direction, the redox flow battery is charged by connecting the redox flow battery to an external power source and supplying a current to the redox flow battery. The electromotive force of the redox flow battery is determined by the difference between standard electrode potentials ($E^o$) of the redox couple constituting the catholyte and the anolyte.

Generally, a catholyte is charged when a redox couple is oxidized to a higher one of two oxidation states, and is discharged when reduced to a lower one of the two oxidation states. In contrast, an anolyte is charged when a redox couple is reduced to a lower one of two oxidation states, and is discharged when oxidized to a higher one of the two oxidation states;

Cathode
$C^n \rightarrow C^{n-y} + ye^-$ (Charge)
$C^{n-y} + ye^- \rightarrow C^n$ (Discharge)
(C: Catholyte)
Anode
$A^{n-x} + xe^- \rightarrow A^n$ (Charge)
$A^n \rightarrow A^{n-x} + xe^-$ (Discharge)
(A: Anolyte)

Since the working potential of a typical redox flow battery using an aqueous solvent is limited to water-decomposition potential areas, the typical redox flow battery has a low driving voltage, and thus, it has low energy density. Accordingly, a non-aqueous solvent may be used to increase the energy density of the redox flow battery. In addition, in order for a redox flow battery to have high energy density, a large amount of a metal salt used as a redox couple needs to be dissolved in a non-aqueous organic solvent. An anion such as $BF_4^-$ or $PF_6^-$ may be used in the metal salt. However, a coulomb force is localized between the cation and the anion of the metal salt and thus the metal salt becomes electrochemically stabilized, thereby appearing as if in a solid state. In addition, the viscosity of the metal salt increases and thus it is difficult to dissolve the metal salt in the non-aqueous solvent.

When the electrolyte for a redox flow battery according to the present embodiment is used, electrons are delocalized, and electrostatic interactions between the cation and anion of the metal salt are interrupted, whereby the solubility of the metal salt in the non-aqueous solvent may be enhanced.

The term "at least four atoms linked to each other by a straight chain in a certain direction" as used herein refers to, in a structural formula, at least four atoms consecutively linked to each other by covalent bonds in a certain direction. For example, an anion such as $BF_4^-$ or $PF_6^-$ has three atoms linked to each other by a straight chain in a certain direction.

The anion may include at least 8 atoms. For example, the anion may include 8 to 1,000 atoms, for example, 8 to 500 atoms, for example, 8 to 100 atoms.

The maximum diameter of the anion may be in the range of about 6 Å to about 12 Å, for example, in the range of about 6 Å to about 10 Å, for example, in the range of about 6 Å to about 8 Å.

The term "the maximum diameter of the anion" as used herein refers to, in a stereochemical formula, the straight-line distance between atoms at both ends of a backbone having a maximum atom number included in the anion.

For example, when the anion is

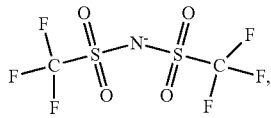

it has a three-dimensional stereochemical structure as illustrated in FIG. 1A. In this regard, atoms at both ends of the backbone having a maximum atom number included in the anion are F and F, and the straight-line distance between the two Fs is 8 Å.

In addition, for example, when the anion is

Figure 1B:
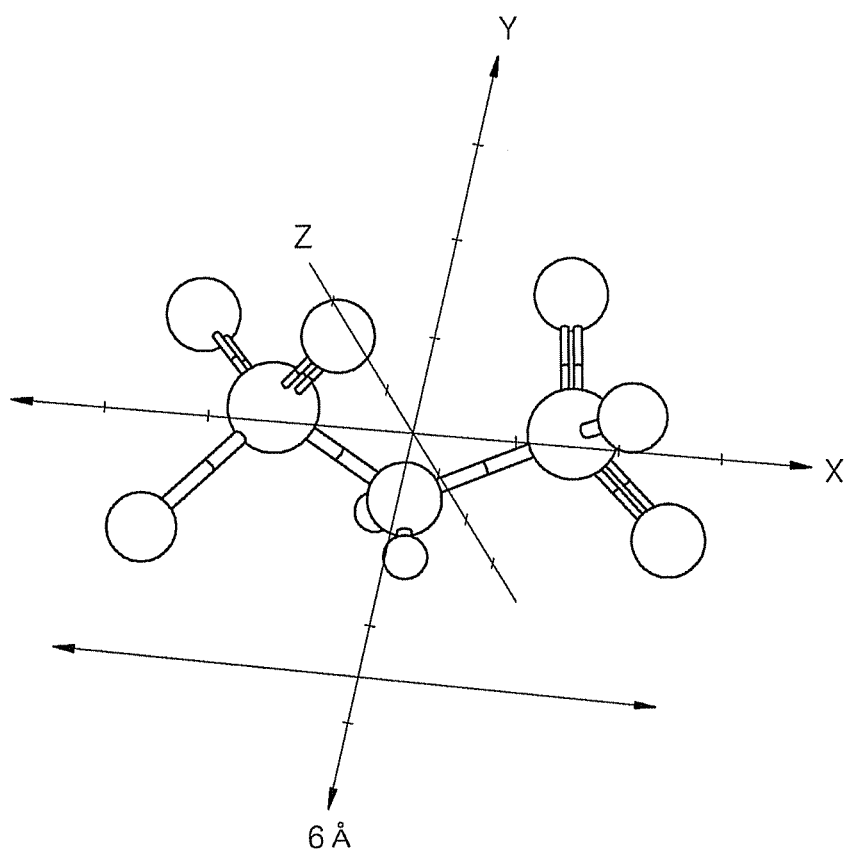
FIG. 1B illustrates a three-dimensional structure of an anion according to another embodiment.

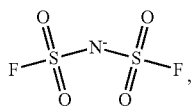

it has a three-dimensional stereochemical structure as illustrated in FIG. 1B. In this regard, atoms at both ends of the backbone having a maximum atom number included in the anion are F and F, and the straight-line distance between the two Fs is 6 Å.

By using the electrolyte for a redox flow battery including the anion having a maximum diameter within the range described above, electrons may be dispersed very well in the structure of the electrolyte, thereby interrupting the electrostatic interactions and thus the solubility of the metal in the non-aqueous solvent may be enhanced. In addition, the stability of the redox couple in the electrolyte is high and thus the lifetime characteristics of the redox couple battery may be enhanced.

The anion may include at least one of the anions represented by Formulae 1 through 4 below:

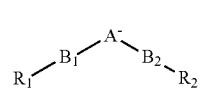

<Formula 1> wherein A is N or P;
$B_1$ and $B_2$ may be each independently

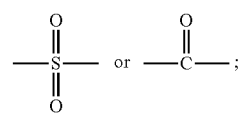

and
$R_1$ and $R_2$ may be each independently a halogen atom, a $C_1$-$C_5$ alkyl group, a $C_1$-$C_5$ alkyl group substituted with at least one halogen atom, a $C_6$-$C_{10}$ aryl group, a $C_6$-$C_{10}$ aryl group substituted with at least one halogen atom, or a $C_2$-$C_5$ alkenyl group. For example, $R_1$ and $R_2$ may be each independently a $C_1$-$C_3$ alkyl group or a $C_1$-$C_3$ alkyl group substituted with at least one halogen atom; provided that the following anions are excluded: an anion according to Formula 1, wherein each of $B_1$ and $B_2$ is

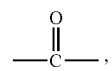

and each of $R_1$ and $R_2$ is a halogen atom,

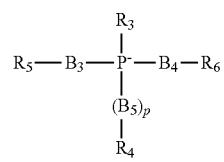

<Formula 2> wherein $B_3$ through $B_5$ are each independently

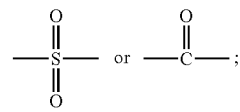

p is 0 or 1; and
$R_3$ through $R_6$ may be each independently a halogen atom, a $C_1$-$C_5$ alkyl group, a $C_1$-$C_5$ alkyl group substituted with at least one halogen atom, a $C_6$-$C_{10}$ aryl group, a $C_6$-$C_{10}$ aryl group substituted with at least one halogen atom, or a $C_2$-$C_5$ alkenyl group. For example, $R_3$ through $R_6$ may be each independently a $C_1$-$C_3$ alkyl group or a $C_1$-$C_3$ alkyl group substituted with at least one halogen atom; provided that the following anions are excluded: an anion according to Formula 2, wherein each of $B_3$ and $B_4$ is

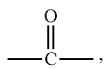

and each of $R_5$ and $R_6$ is a halogen atom,

<Formula 3>

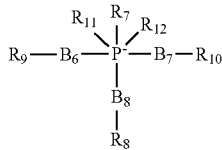

wherein $B_6$ through $B_6$ are each independently

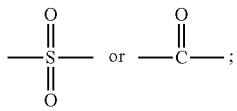

and $R_7$ through $R_{12}$ may be each independently a halogen atom, a $C_1$-$C_5$ alkyl group, a $C_1$-$C_5$ alkyl group substituted with at least one halogen atom, a $C_6$-$C_{10}$ aryl group, a $C_6$-$C_{10}$ aryl group substituted with at least one halogen atom, or a $C_2$-$C_5$ alkenyl group. For example, $R_7$ through $R_{12}$ may be each independently a $C_1$-$C_3$ alkyl group or a $C_1$-$C_3$ alkyl group substituted with at least one halogen atom; provided that the following anions are excluded: an anion according to Formula 3, wherein each of $B_6$ and $B_7$ is

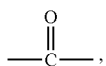

and each of $R_9$ and $R_{10}$ is a halogen atom,

<Formula 4>

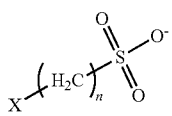

wherein n is an integer of 1 to 8, for example, an integer of 1 to 5, and X may be a halogen atom, for example, F, Cl, or Br.

The anion may be at least one selected from the group consisting of

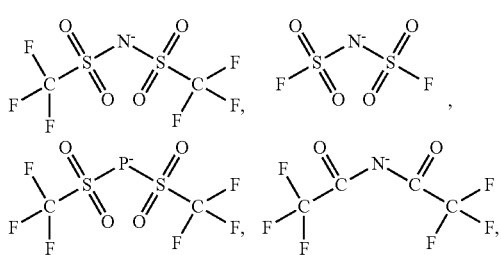

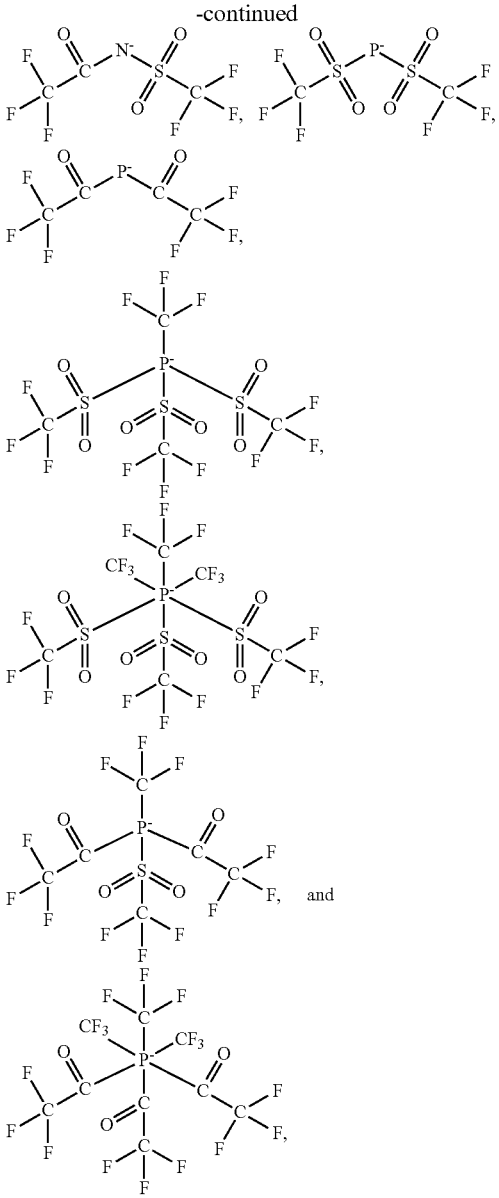

and

For example, the anion may be

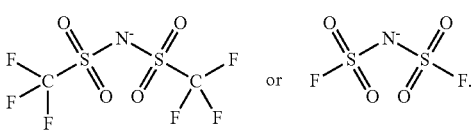 [SMILES: O=S(=O)([N-]S(=O)(=O)C(F)(F)F)C(F)(F)F ; "or" ; O=S(=O)(F)[N-]S(=O)(=O)F]

The solubility of the metal salt including the anion described above in the non-aqueous solvent is enhanced and thus a larger amount of the metal salt is included in the electrolyte for a redox flow battery. Therefore, a redox flow battery including such electrolyte has high energy density.

The metal in the metal-ligand coordination compound acting as a cation may be at least one selected from the group consisting of nickel (Ni), cobalt (Co), iron (Fe), ruthenium (Ru), zinc (Zn), manganese (Mn), yttrium (Y), zirconium (Zr), titanium (Ti), chromium (Cr), magnesium (Mg), cerium (Ce), copper (Cu), lead (Pb), and vanadium (V).

The ligand in the metal-ligand coordination compound acting as a cation may be at least one selected from the group consisting of dipyridyl, terpyridyl, phenanthroline, acetylacetonate, ethylenediamine, propylenediamine, and N-heterocyclic carbene (NHC).

For example, the NHC ligand may be at least one selected from the group consisting of 2,6-bis(methylimidazole-2-ylidene)pyridine, 1,3-dimesitylimidazole, 1,3-bis(2,5-diisopropylphenyl)imidazole, 1,3-dimethylimidazole, 1,3-di-tert-butylimidazole, 1,3-dicyclohexylimidazole, and 1-ethyl-3-methylimidazole.

The metal-ligand coordination compound may be, but is not limited to, at least one of the following cations:

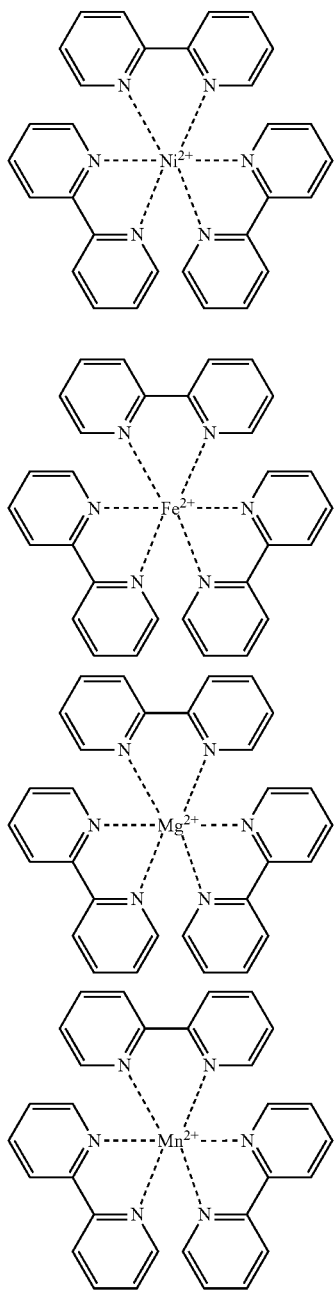

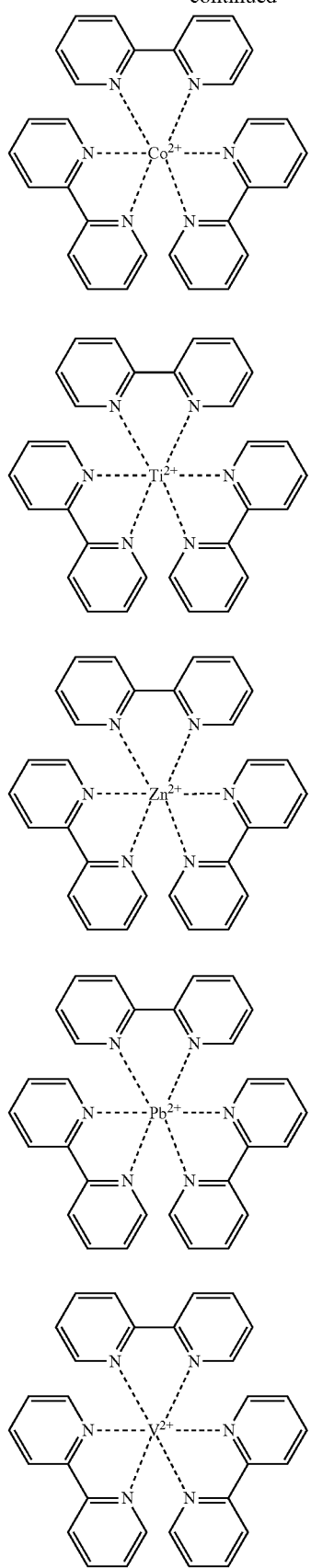

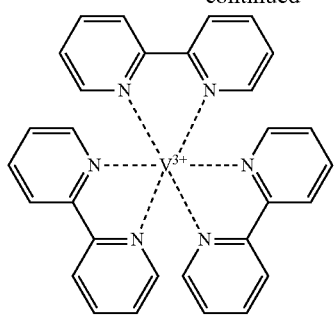
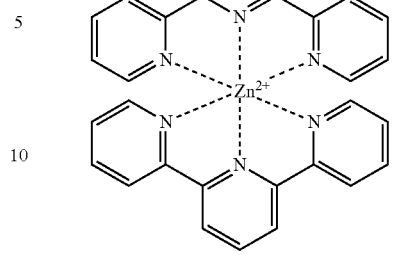
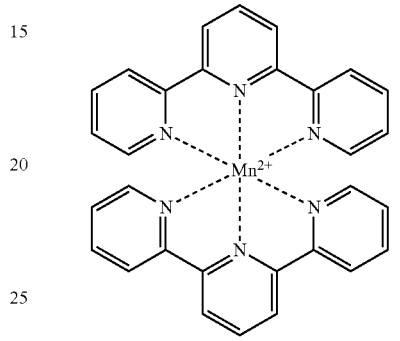
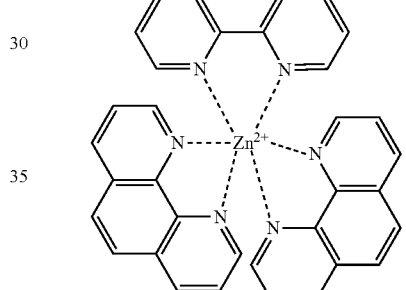
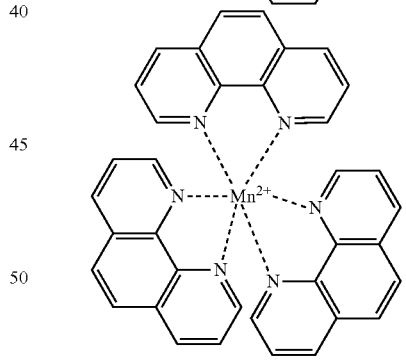
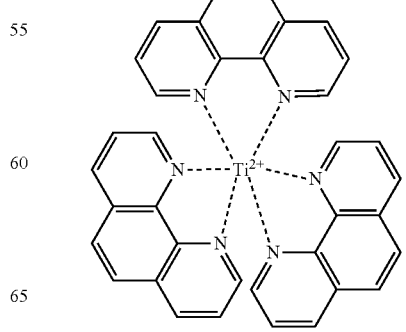

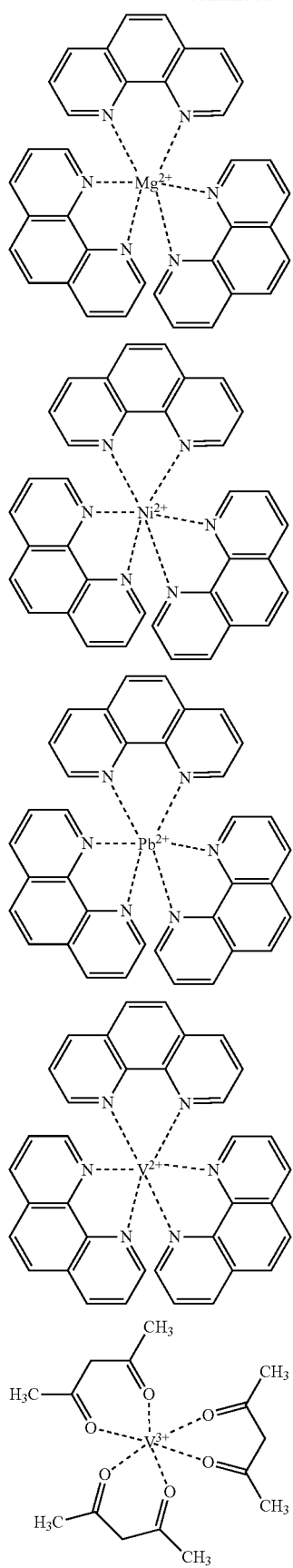
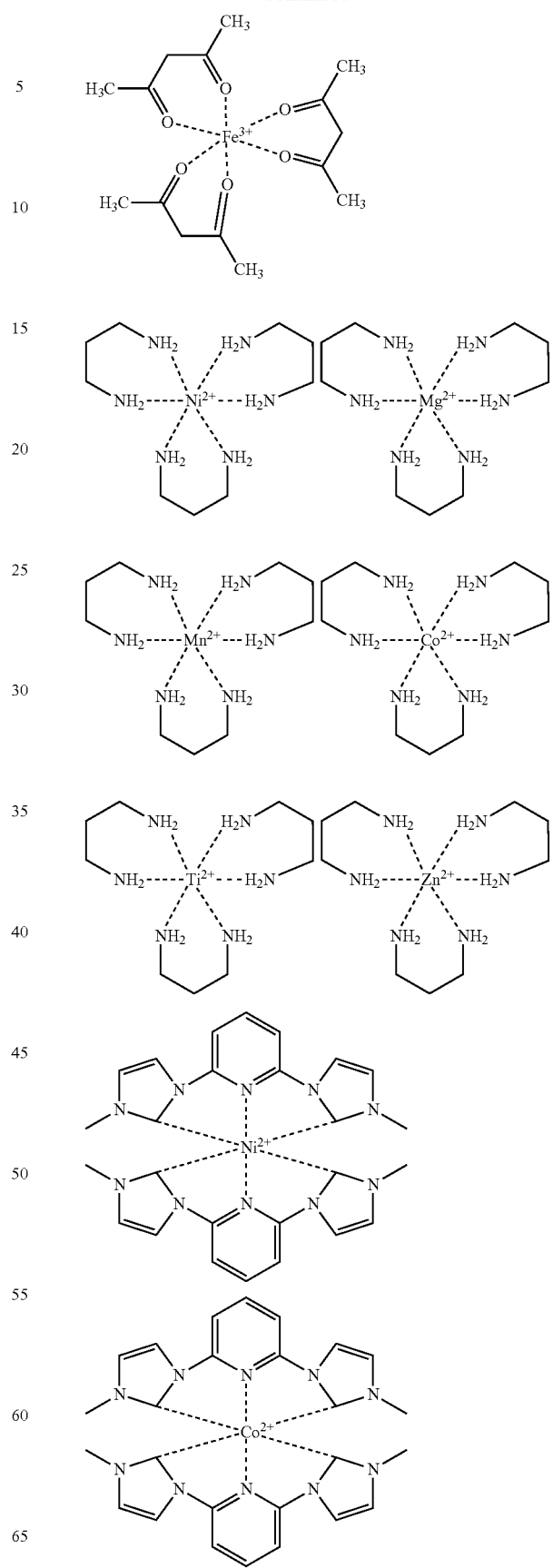

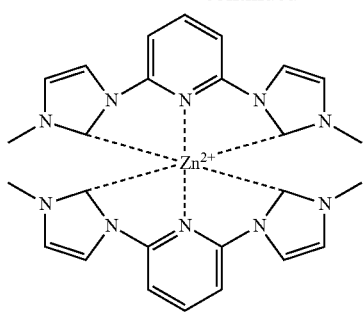

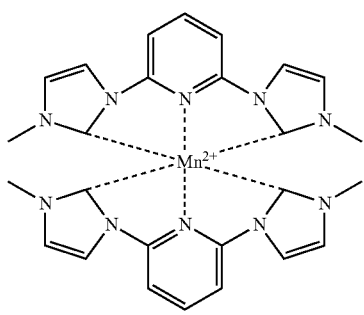

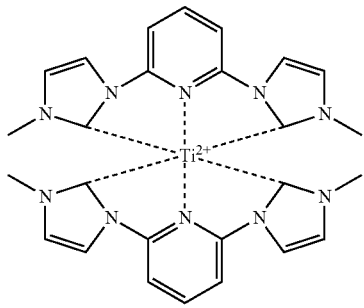

A reversible oxidation/reduction reaction may occur in the metal-ligand coordination compound.

The metal salt may be

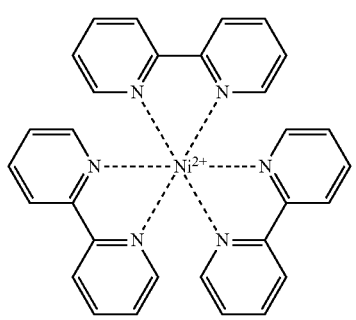

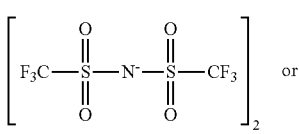 or

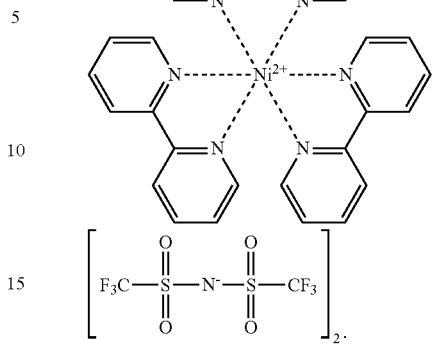

The concentration of the metal salt may be in the range of about 1.2 M to about 5.0 M, for example, in the range of about 1.2 M to about 4.5 M.

A redox flow battery including the electrolyte including the metal salt within the range of concentration described above may have high energy density.

The non-aqueous solvent may be at least one selected from the group consisting of diethyl carbonate, dimethyl carbonate, acetonitrile, γ-butyrolactone (GBL), propylene carbonate (PC), ethylene carbonate (EC), N-methyl-2-pyrrolidone (NMP), fluoroethylene carbonate, and N,N-dimethylacetamide. The non-aqueous solvent is not particularly limited, and may be any non-aqueous solvent used in the art.

The supporting electrolyte does not directly participate in a reaction and functions as a charge balance between a catholyte and an anolyte.

For example, the supporting electrolyte may be at least one selected from the group consisting of $LiBF_4$, $LiPF_6$, $LiClO_4$, $LiCF_3SO_3$, $Li(CF_3SO_2)_2N$, tetraethylammonium tetrafluoroborate ($TEABF_4$), tetrabutylammonium tetrafluoroborate ($TBABF_4$), $NaBF_4$, $NaPF_6$, potassium bis(fluorosulfonyl)imide, methanesulfonyl chloride, and $(NH_4)_2SO_4$. When the supporting electrolyte is used instead of sulphuric acid, a non-aqueous solvent may be used to manufacture an electrolyte.

According to another embodiment of the present invention, a redox flow battery includes a cathode cell including a cathode and a catholyte; an anode cell including an anode and an anolyte; and an ion exchange membrane disposed between the cathode cell and the anode cell, wherein at least one of the catholyte and the anolyte includes the anion described above.

The redox flow battery may further include a catholyte tank and an anolyte tank respectively connected to the cathode cell and the anode cell to transfer a fluid.

Figure 2:
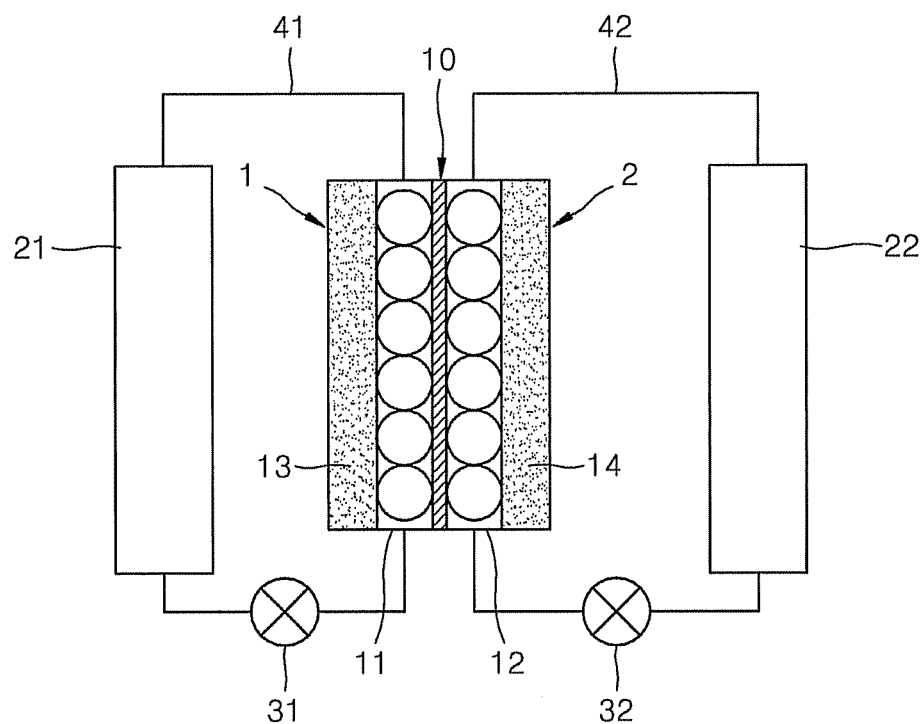
FIG. 2 is a schematic diagram illustrating a structure of a redox flow battery according to an embodiment.

FIG. 2 is a schematic diagram illustrating a structure of a redox flow battery according to an embodiment.

Referring to FIG. 2, the redox flow battery includes a cathode cell 1 and an anode cell 2, which are divided by an ion exchange membrane 10. The cathode cell 1 and the anode cell 2 respectively include a cathode 13 and an anode 14. The cathode cell 1 is connected to a cathode tank 21 for supplying and outflowing a catholyte 11 through a catholyte pipe 41. Similarly, the anode cell 2 is connected to an anode tank 22 for supplying and outflowing an anolyte 12 through an anolyte pipe 42. The catholyte and anolyte 11 and 12 respectively circulate through pumps 31 and 32, and the cathode 13 and the anode 14 charge and discharge according to a change of oxidation states of ions.

When the electrolyte for a redox flow battery described above is used, electrons are delocalized and electrostatic interactions between the cation and anion of the metal salt are interrupted and thus the solubility of the metal salt in the non-aqueous solvent may be enhanced, resulting in enhanced energy density of the redox flow battery. In addition, the stability of the redox couple in the electrolyte is high and thus the lifetime characteristics of the redox flow battery may be enhanced.

The ion exchange membrane 10 prevents ions of active materials of the catholyte 11 and the anolyte 12 from being mixed with each other, and permits only ions of a charge carrier of the supporting electrolyte to be transferred.

The ion exchange membrane 10 may be any well known ion exchange membrane used in general redox flow batteries. A cation exchange membrane may be a cation exchange membrane obtained by sulfonating a styrene-divinylbenzene copolymer, a cation exchange membrane introducing a sulfonic acid group by using a copolymer of tetrafluoroethylene and perfluorosulfonyl ethoxy vinyl ether as a base, a cation exchange membrane formed of a copolymer of tetrafluoroethylene and a perfluoro vinyl ether having a carboxyl group at a side chain, or a cation exchange membrane introducing a sulfonic acid group by using an aromatic polysulfone copolymer as a base.

When a typical cation exchange membrane is used, salts of $Na^+$, $Li^+$, or $H^+$ cation are used as sources of charge carriers. However, the solubility of such salts decreases in an organic solvent. When a small amount of water is added in order to increase solubility, the ligand is unstable and thus an oxidation/reduction reaction is not completely reversible. An anion exchange membrane prevents a catholyte and an anolyte from mixing with each other, allows counter anions of the metal-ligand coordination compound to be used as charge carriers, ensures concentration of a sufficient amount of charge carriers with a small amount of supporting electrolyte, and suppresses movement of active materials which are cations and thus the redox flow battery may exhibit high charge/discharge efficiency and voltage efficiency.

The anion exchange membrane may be an anion exchange membrane obtained by aminating a copolymer of styrene-divinylbenzene used as a base by introducing a chloromethyl group, an anion exchange membrane obtained by substituting a copolymer of vinylpyridine-divinyl benzene with quaternary pyridium, or an anion exchange membrane obtained by aminating an aromatic polysulfone copolymer used as a base by introducing a chloromethyl group. Examples of a commercially available anion exchange membrane include NEO-SEPTA®-AMEX, NEOSEPTA®-AHA, and NEOSEPTA®-ACS from ASTOM/TOKUYAMA; Sybron lonan MA3475 from LANXESS; FUMASEP® FAS, FAB, FAN, FAA, FAD from FuMA-Tech; and PC 100D, PC 200D, and PC-SA from Polymerchemie Altmeier (PCA).

One or more embodiments of the present invention will now be described in greater detail with reference to the following examples. However, these examples are for illustrative purposes only and are not intended to limit the scope of the invention. In addition, it is understood that exemplary embodiments of the present invention are not limited to the following examples, and other embodiments are technically obtained by one of ordinary skill in the art to which the present invention pertains.

In the following examples, "bpy" in $Ni(bpy)_3(BF_4)_2$ is an abbreviation for bipyridine, "TFSI" in LiTFSI is an abbreviation for bis(trifluoromethanesulfonyl)imide, and "FSI" in KFSI is an abbreviation for bis(fluorosulfonyl)imide.

EXAMPLES

Preparation of Metal Salt

Preparation Example 1

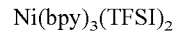

$Ni(bpy)_3(TFSI)_2$

A stirring bar was placed in a 500 ml round-bottom flask, and 1 g of $Ni(bpy)_3(BF_4)_2$ (1.43 mmol) and 0.87 g of LiTFSI (3.03 mmol) were added to 150 ml of $H_2O$. The mixture was then stirred in the flask at room temperature for 24 hours to exchange anions. In that time period, the reaction mixture divided into a water layer and a layer of a pink color. The reaction mixture was poured into a 1 L separatory funnel to extract the product by using 200 ml of methylene chloride. Subsequently, the extraction process was repeated twice by using the same amount of methylene chloride. Anhydrous $MgSO_4$ was added to the methylene chloride including the extracted product, the mixture was stirred for 3 minutes, and the separatory funnel was closed with a stopper. The mixture was then dried for 30 minutes and then filtered. Subsequently, methylene chloride was removed at 25° C. using a rotary evaporator, the resulting product was dried in a vacuum at room temperature for 3 hours to obtain 1.40 g of a pink solid metal salt (yield: about 90%).

Figure 3:
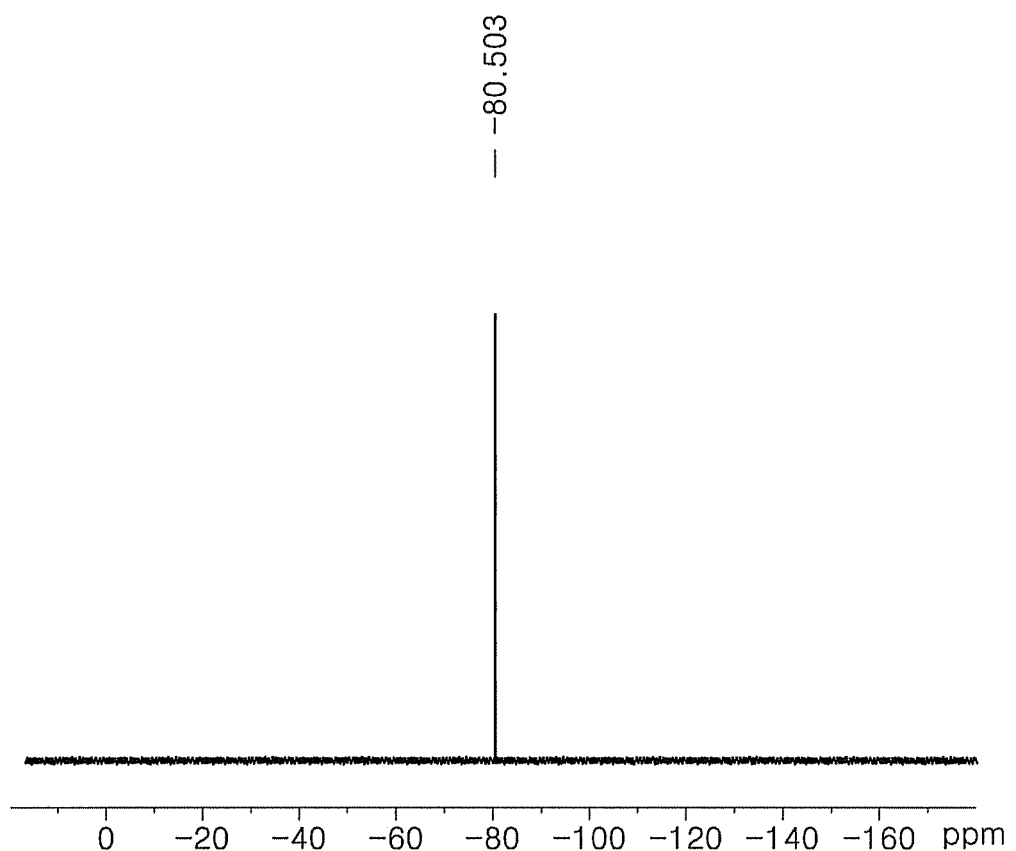
FIG. 3 illustrates the $^{19}$F-NMR spectrum of a metal salt prepared according to Preparation Example 1.

$^{19}$F-NMR spectrum measurement results of the metal salt are illustrated in FIG. 3. Referring to FIG. 3, it is confirmed that a peak exists at −80.5 ppm.

Preparation Example 2

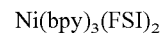

$Ni(bpy)_3(FSI)_2$ 1.17 g of a pink solid metal salt (yield: 92%) was prepared in the same manner as in Preparation Example 1, except that 0.66 g of KFSI (3.03 mmol) was used instead of 0.87 g of LiTFSI (3.03 mmol).

Figure 4:
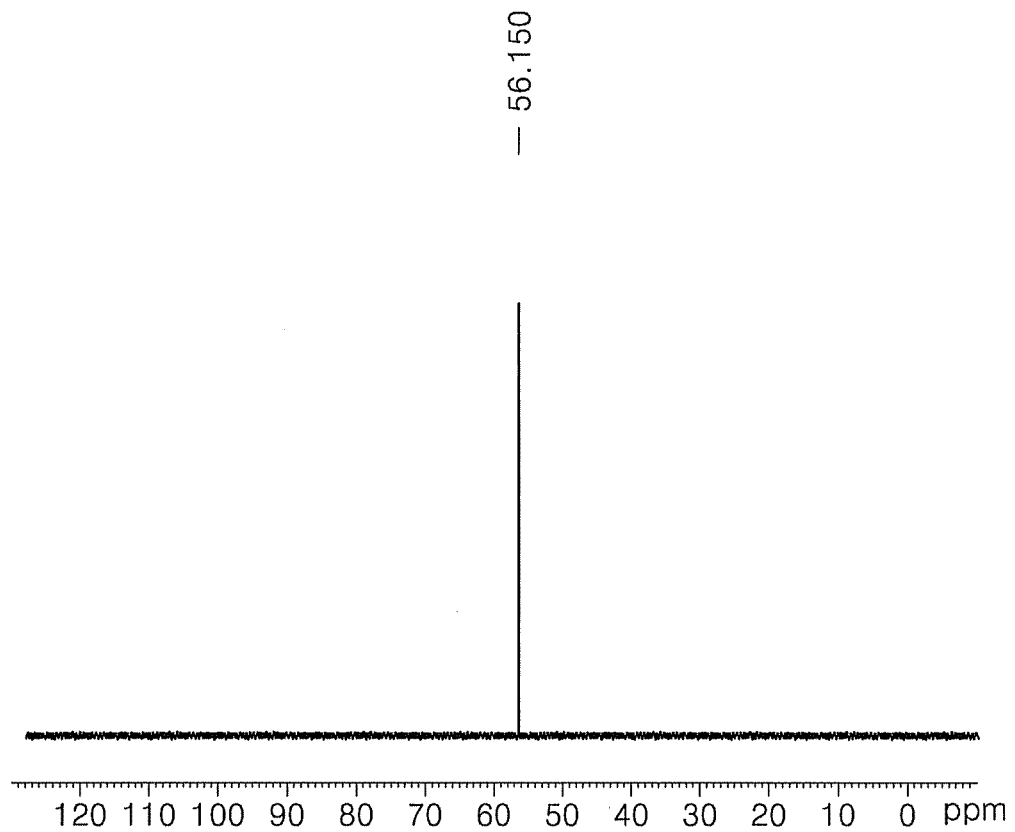
FIG. 4 illustrates the $^{19}$F-NMR spectrum of a metal salt prepared according to Preparation Example 2.

$^{19}$F-NMR spectrum measurement results of the metal salt are illustrated in FIG. 4, from which it is confirmed that a peak exists at 56.2 ppm.

Preparation Example 3

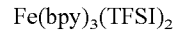

$Fe(bpy)_3(TFSI)_2$ 1.4 g of a red solid metal salt (yield: 91%) was prepared in the same manner as in Preparation Example 1, except that 1 g of $Fe(bpy)_3(BF_4)_2$ (1.43 mmol) was used instead of 1 g of $Ni(bpy)_3(BF_4)_2$ (1.43 mmol).

Preparation Example 4

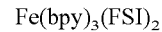

$Fe(bpy)_3(FSI)_2$ 1.17 g of a red solid metal salt (yield: 92%) was prepared in the same manner as in Preparation Example 1, except that 1 g of $Fe(bpy)_3(BF_4)_2$ (1.43 mmol) was used instead of 1 g of $Ni(bpy)_3(BF_4)_2$ (1.43 mmol) and 0.66 g of KFSI (3.03 mmol) was used instead of 0.87 g of LiTFSI (3.03 mmol).

Comparative Preparation Example 1

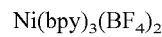

$Ni(bpy)_3(BF_4)_2$ 7.99 g (23.48 mmol) of $Ni(BF_4)_2\cdot 6H_2O$ was put into a 100 ml round-bottom flask and 50 ml of ethanol was added thereto. Then, the mixture was stirred for 20 minutes until the mixture was in solution. 11 g (70.43 mmol) of bipyridine was put into another 100 ml round-bottom flask and 90 ml of ethanol was added thereto to form a second mixture. Then, the second mixture was stirred for 10 minutes until the second mixture was in solution.

The bipyridine solution was gradually added to the $Ni(BF_4)_2 \cdot 6H_2O$ solution to form a third mixture. Then, the third mixture was stirred for 2.5 hours at room temperature until the third mixture gradually turned from green to pink. The resultant was filtered, washed three times using 150 ml of water and ethanol, naturally dried, and dried in a vacuum oven, thereby obtaining 15.09 g of a pink solid metal salt (yield: 91.7%).

Figure 5:
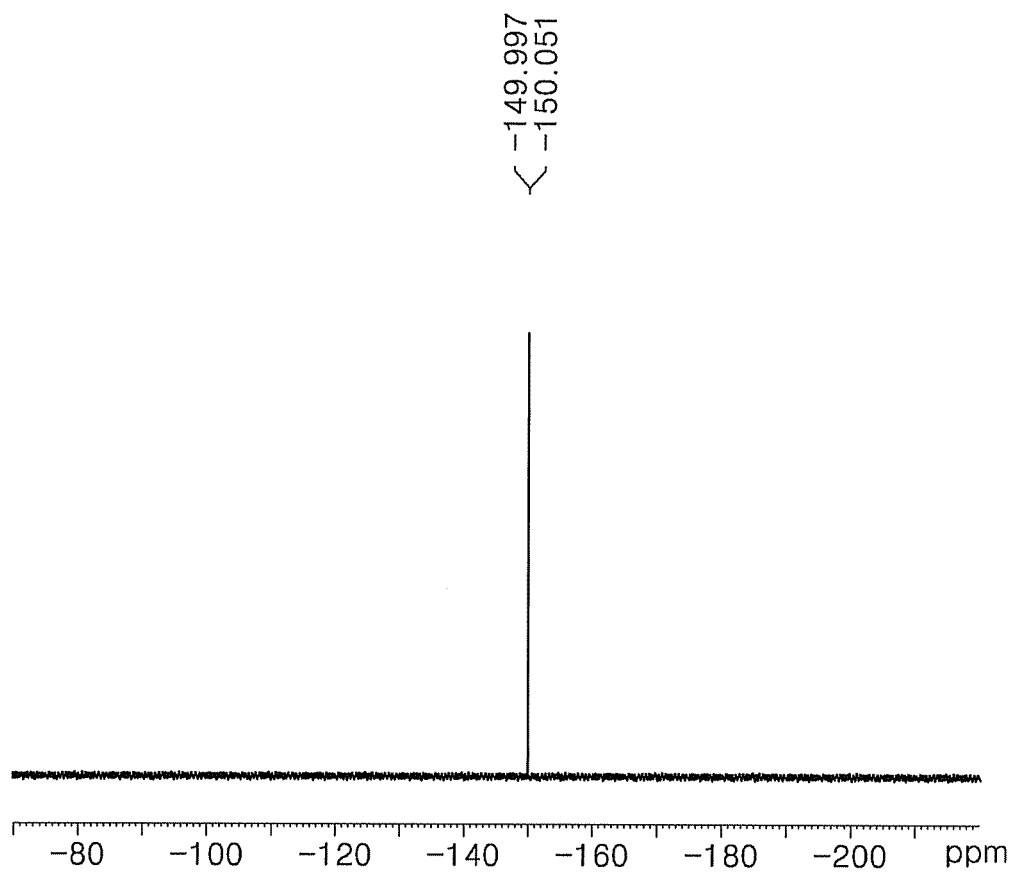
FIG. 5 illustrates the $^{19}$F-NMR spectrum of a metal salt prepared according to Comparative Preparation Example 1.

$^{19}$F-NMR spectrum measurement results of the metal salt are illustrated in FIG. 5, from which it is confirmed that a peak exists at −150.1 ppm.

Comparative Preparation Example 2

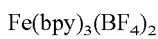

16.632 g of a dark red solid metal salt (yield: 79.7%) was prepared in the same manner as in Comparative Preparation Example 1, except that 15.24 g (29.88 mmol) of $Fe(BF_4)_2 \cdot 6H_2O$ was used instead of 7.99 g (23.48 mmol) of $Ni(BF_4)_2 \cdot 6H_2O$.

Preparation of Electrolyte for Redox Flow Battery

Example 1

Electrolyte for Redox Flow Battery

An electrolyte for a redox flow battery including 1.0 M of the metal salt prepared according to Preparation Example 1, 0.5 M of $TEABF_4$ as a supporting electrolyte, and γ-butyrolactone (GBL) as a solvent was prepared.

Example 2

Electrolyte for Redox Flow Battery

An electrolyte for a redox flow battery was prepared using the metal salt prepared according to Preparation Example 2, instead of the metal salt of Preparation Example 1.

Example 3

Electrolyte for Redox Flow Battery

An electrolyte for a redox flow battery was prepared using the metal salt prepared according to Preparation Example 3, instead of the metal salt of Preparation Example 1.

Example 4

Electrolyte for Redox Flow Battery

An electrolyte for a redox flow battery was prepared using the metal salt prepared according to Preparation Example 4, instead of the metal salt of Preparation Example 1.

Comparative Example 1

Electrolyte for Redox Flow Battery

An electrolyte for a redox flow battery was prepared using the metal salt prepared according to Comparative Preparation Example 1, instead of the metal salt of Preparation Example 1.

Comparative Example 2

Electrolyte for Redox Flow Battery

An electrolyte for a redox flow battery was prepared using the metal salt prepared according to Comparative Preparation Example 2, instead of the metal salt of Preparation Example 1.

Manufacturing of Redox Flow Battery

Example 5

Redox Flow Battery

The electrolyte prepared according to Example 1 was used as a catholyte and an anolyte. An electrode prepared by thermally treating carbon felt (Nippon Graphite, GF20-3, t=3 mm, A=5×5 cm$^2$) at 500° C. for 5 hours in an air atmosphere was used. A Na conductive NAFION® membrane (product name: NAFION 117, manufacturer: Dupont) was used as an ion exchange membrane.

A nut integrated end plate was disposed at the bottom, and an insulator, a current collector, and a bipolar plate were stacked on the end plate. A square carbon felt electrode having a size of 5×5 cm$^2$ was cut in half so as to make a rectangle electrode and the electrode was then inserted into a concave of the bipolar plate.

3 ml of the electrolyte prepared as above was injected into a positive carbon felt electrode and a negative carbon felt electrode prepared as above, and then the positive carbon felt electrode and the negative carbon felt electrode were assembled. A bolt, to which a Belleville disc spring was fixed, was tightened to 1.5 Nm in a diagonal order using a torque wrench. After completing the assembly, the remaining electrolyte was injected through an injection hole of each electrode and the injection hole was then blocked using a polytetrafluoroethylene (PTFE) bolt. The PTFE bolt having a gas leak hole was used for each bipolar plate.

Example 6

Redox Flow Battery

A redox flow battery was manufactured in the same manner as in Example 5, except that the electrolyte prepared according to Example 2 was used instead of the electrolyte of Example 1.

Example 7

Redox Flow Battery

A redox flow battery was manufactured in the same manner as in Example 5, except that the electrolyte prepared according to Example 3 was used instead of the electrolyte of Example 1.

Example 8

Redox Flow Battery

A redox flow battery was manufactured in the same manner as in Example 5, except that the electrolyte prepared according to Example 4 was used instead of the electrolyte of Example 1.

Comparative Example 3

Redox Flow Battery

A redox flow battery was manufactured in the same manner as in Example 5, except that the electrolyte prepared according to Comparative Example 1 was used instead of the electrolyte of Example 1.

Comparative Example 4

Redox Flow Battery

A redox flow battery was manufactured in the same manner as in Example 5, except that the electrolyte prepared according to Comparative Example 2 was used instead of the electrolyte of Example 1.

Evaluation of Characteristics of Battery

Evaluation Example 1

Measurement of Solubility of Metal Salt

The solubility of each of the metal salts of Preparation Examples 1 through 3 and Comparative Preparation Examples 1 and 2 with respect to propylene carbonate was measured. The results are shown in Table 1 below:

TABLE 1

| Electrolyte | Solubility (M) |
| --- | --- |
| Preparation Example 1 | 1.2 |
| Preparation Example 2 | 1.2 |
| Preparation Example 3 | 4.5 |
| Comparative Preparation Example 1 | 0.9 |
| Comparative Preparation Example 2 | 1.0 |

Referring to Table 1, the metal salts of Preparation Examples 1 through 3 exhibit higher solubility in a non-aqueous solvent than the metal salts of Comparative Preparation Examples 1 and 2. The results confirm that redox flow batteries of Examples 5 through 7 respectively including the metal salts of Preparation Examples 1 through 3 have enhanced energy density.

Evaluation Example 2

Cyclic Voltammetry

A current value as a function of potential was measured for 100 cycles by using each of the electrolytes of Examples 1 and 2, at a potential scan rate of 10 mV/s and in a potential scan range of about −2 V to about 1.25 V. A cell for measuring the cyclic voltammogram included an Ag/Ag$^+$ electrode in which 0.3 M of AgNO$_3$ was dissolved in acetonitrile as a solvent as a reference electrode, carbon felt as a working electrode, and platinum as a counter electrode. The measurement results are illustrated in FIGS. 6A and 6B.

Figure 6A:
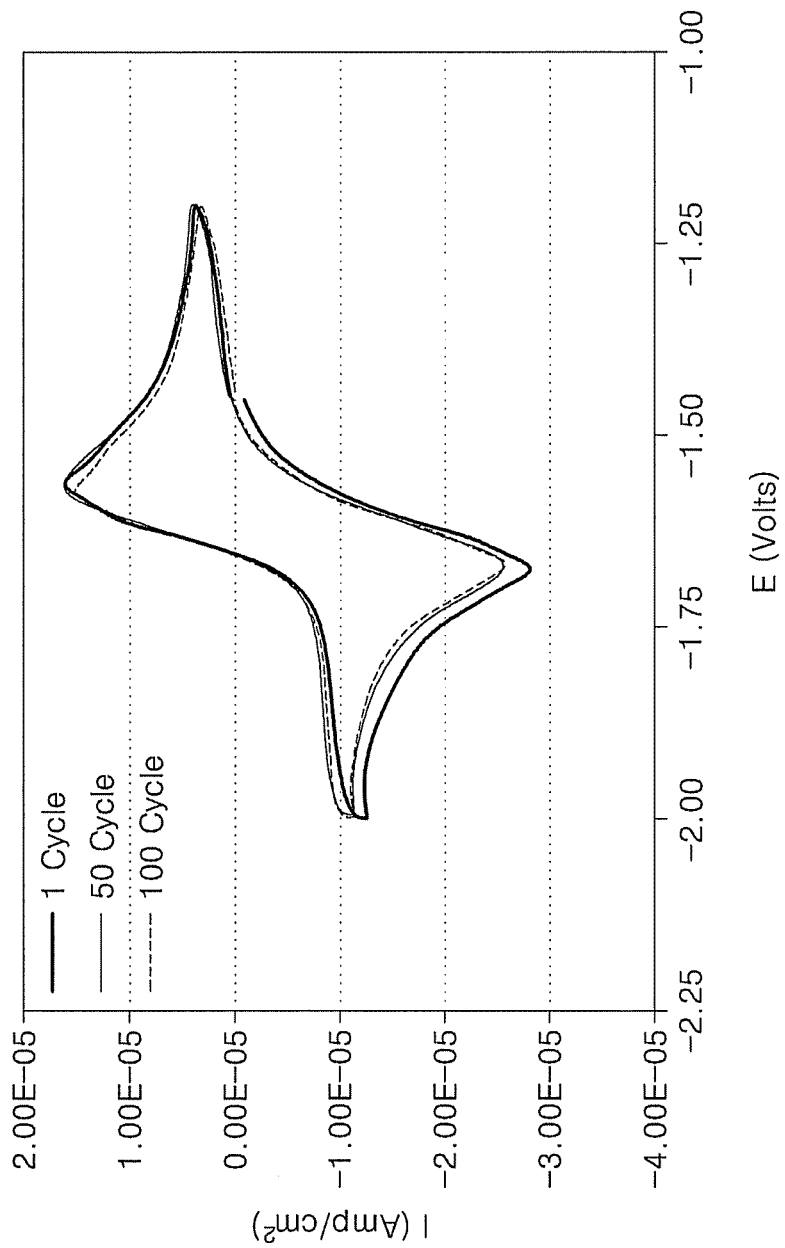
FIGS. 6A and 6B are graphs respectively showing cyclic voltammetry measurement results of electrolytes for redox flow batteries prepared according to Examples 1 and 2.
Figure 6B:
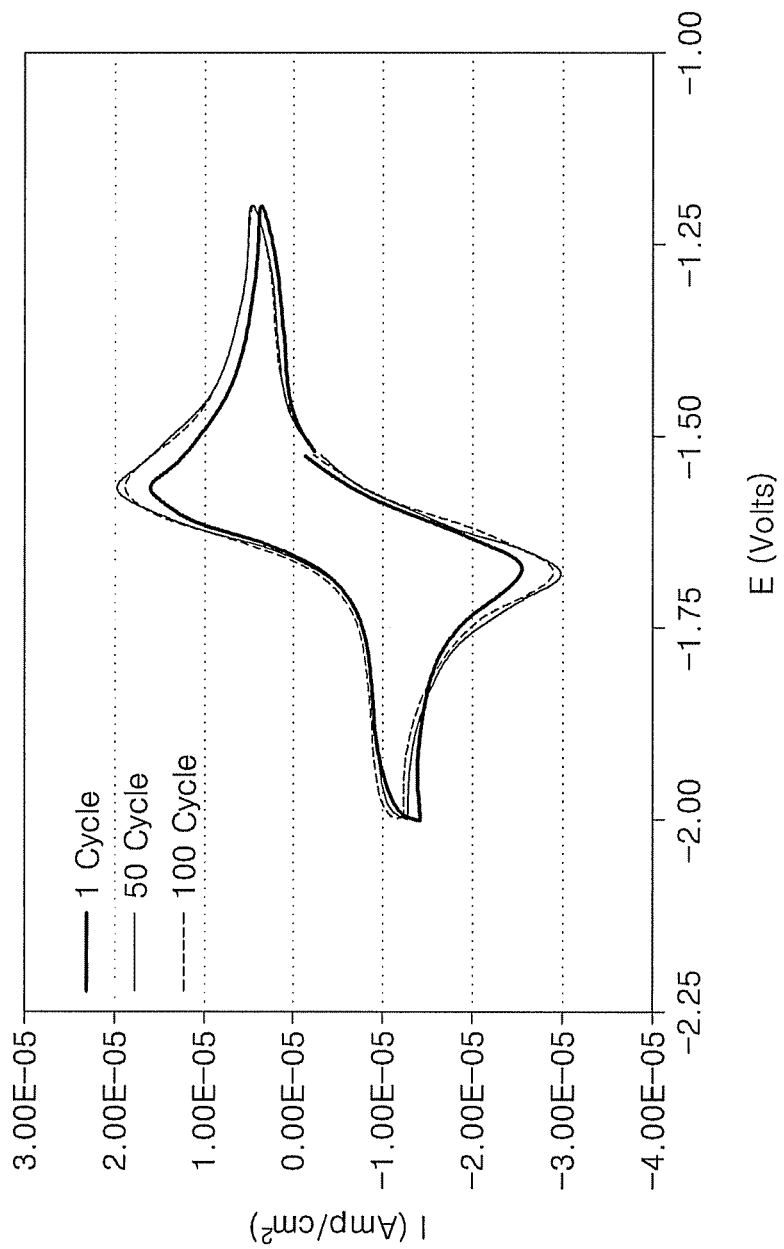

As illustrated in FIGS. 6A and 6B, in the electrolytes of Examples 1 and 2, respectively, the reversible oxidation/reduction peak barely decreased even after 100 cycles. Thus, the electrolytes of Examples 1 and 2 exhibited the same reversibility as that of BF$_4^-$.

The results confirm that the redox couples of the metal salts of Preparation Examples 1 and 2 are respectively stable in the electrolytes of Examples 1 and 2, and, since the metal salts of Preparation Examples 1 and 2 are electrochemically highly reversible and have high solubility with respect to a non-aqueous solvent, the redox flow batteries of Examples 5 and 6 using a non-aqueous solvent, respectively including the metal salts of Preparation Examples 1 and 2, have high energy density.

As described above, according to the one or more of the embodiments of the present invention, an electrolyte for a redox flow battery includes an anion containing at least four atoms linked to each other by a straight chain in a certain direction, thereby interrupting electrostatic interactions between a metal-ligand coordination compound as a cation and the anion, resulting in enhanced solubility of a metal salt in an organic solvent. Thus, a redox flow battery including the electrolyte described above exhibits high energy density and long lifetime.

It should be understood that the exemplary embodiments described herein should be considered in a descriptive sense only and not for purposes of limitation. Descriptions of features or aspects within each embodiment should typically be considered as available for other similar features or aspects in other embodiments.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. An electrolyte for a redox flow battery, the electrolyte comprising:
a non-aqueous solvent;
a supporting electrolyte; and
a metal salt,
wherein the metal salt comprises a metal-ligand coordination compound as a cation and an anion containing at least four atoms linked to each other by a straight chain in a certain direction, and wherein the anion comprises at least one selected from the group consisting of

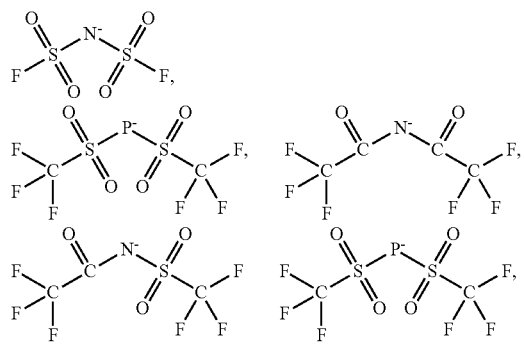

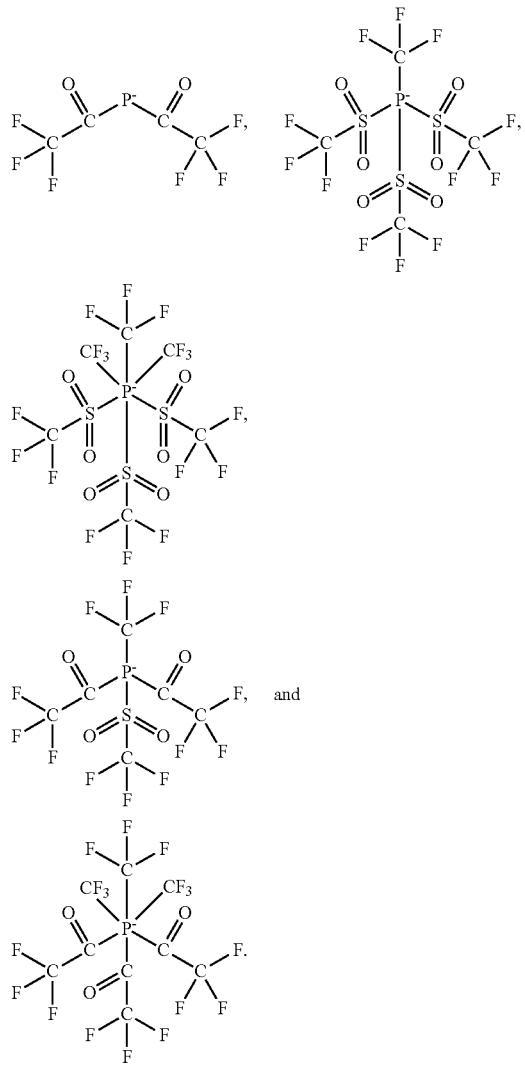

2. The electrolyte of claim 1, wherein a metal in the metal-ligand coordination compound comprises at least one selected from the group consisting of nickel (Ni), cobalt (Co), iron (Fe), ruthenium (Ru), zinc (Zn), manganese (Mn), yttrium (Y), zirconium (Zr), titanium (Ti), chromium (Cr), magnesium (Mg), cerium (Ce), copper (Cu), lead (Pb), and vanadium (V).

3. The electrolyte of claim 1, wherein a ligand in the metal-ligand coordination compound comprises at least one selected from the group consisting of dipyridyl, terpyridyl, phenanthroline, acetylacetonate, ethylenediamine, propylenediamine, and N-heterocyclic carbene (NHC).

4. The electrolyte of claim 3, wherein the N-heterocyclic carbene (NHC) comprises at least one selected from the group consisting of 2,6-bis(methylimidazole-2-ylidene)pyridine, 1,3-dimesitylimidazole, 1,3-bis(2,5-diisopropylphenyl)imidazole, 1,3-dimethylimidazole, 1,3-di-tert-butylimidazole, 1,3-dicyclohexylimidazole, and 1-ethyl-3-methylimidazole.

5. The electrolyte of claim 1, wherein the metal-ligand coordination compound comprises at least one of the following compounds:

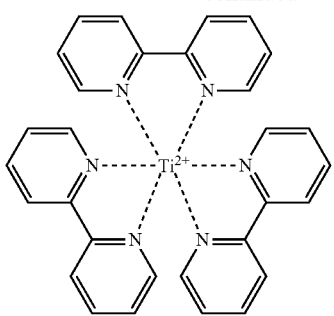
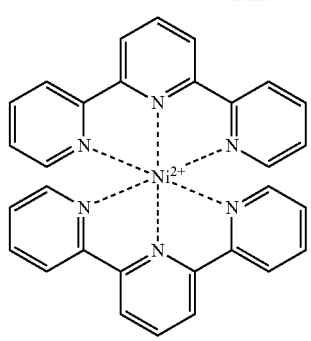
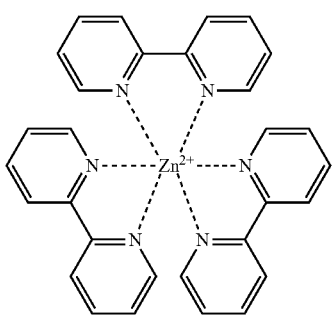
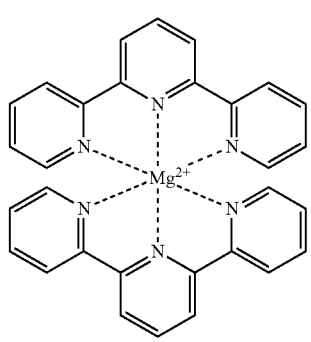
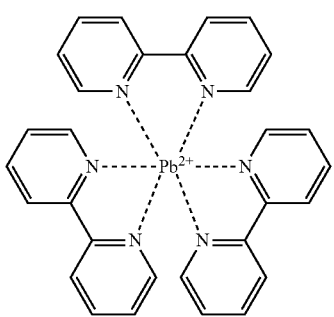
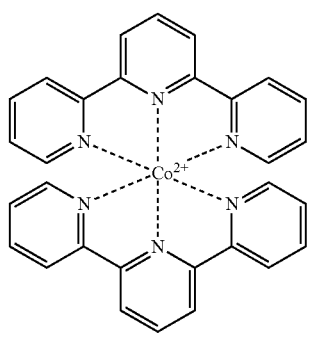
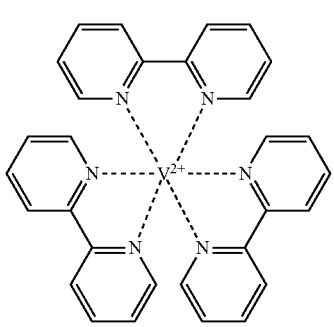
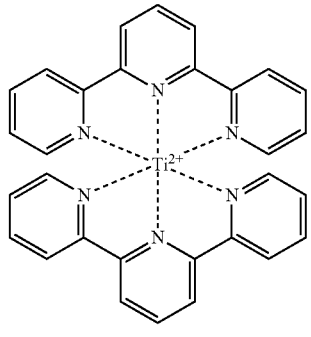
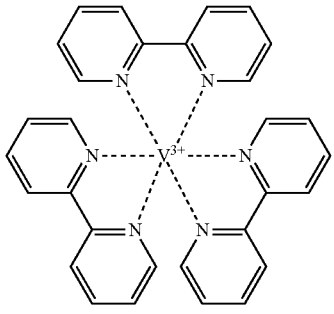
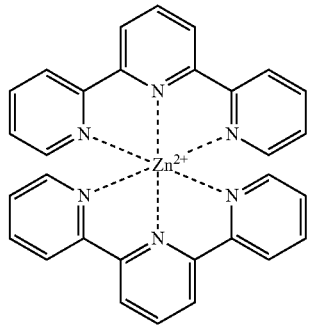

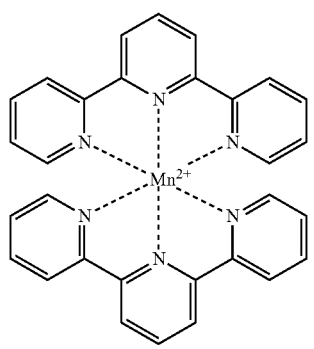
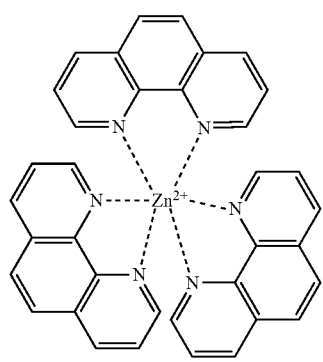
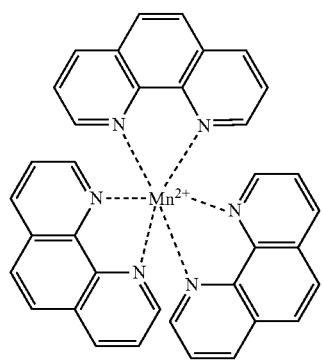
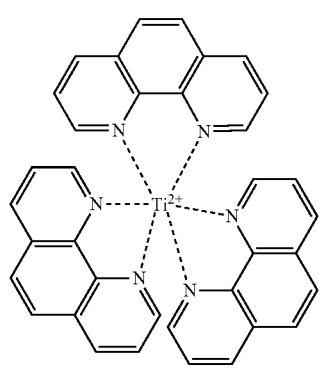
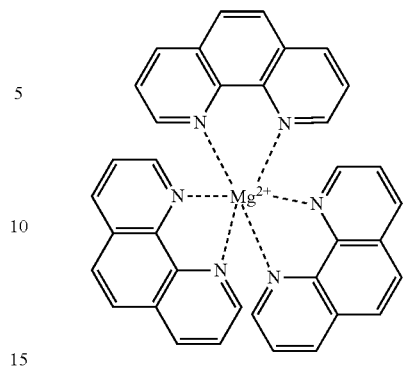
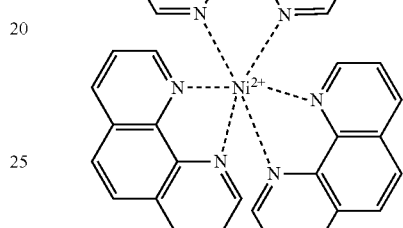
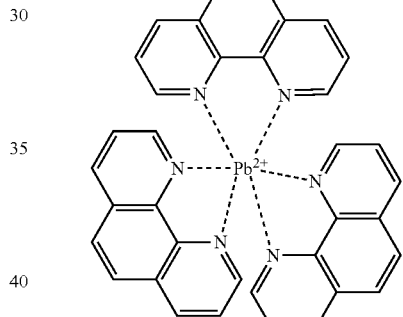
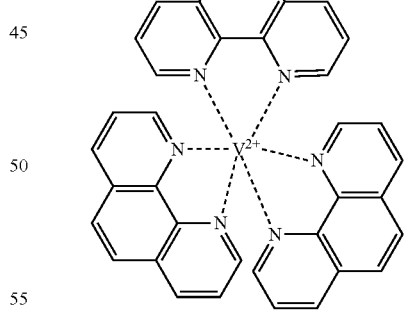
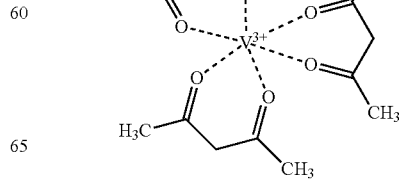

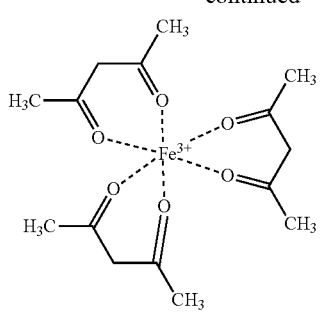

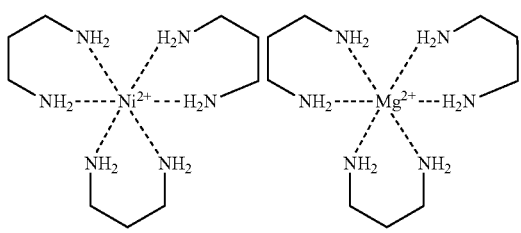

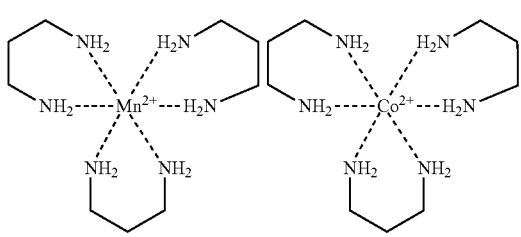

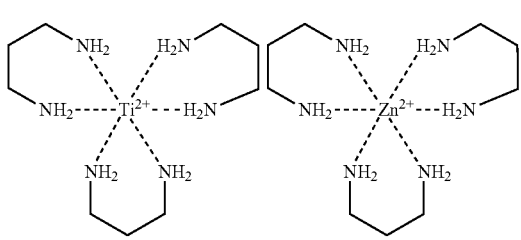

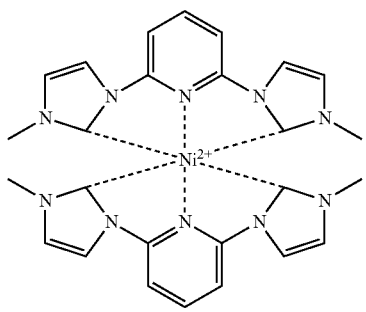

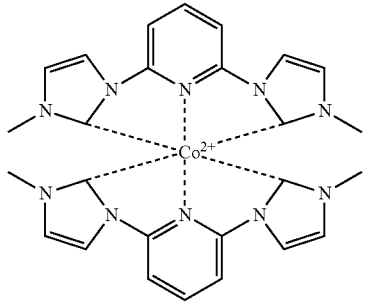

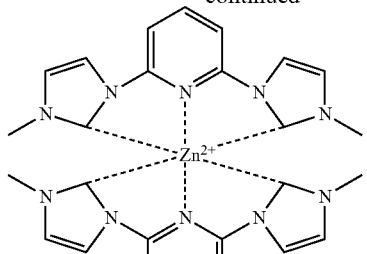

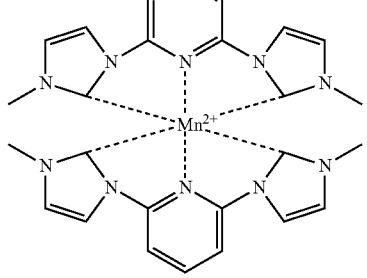

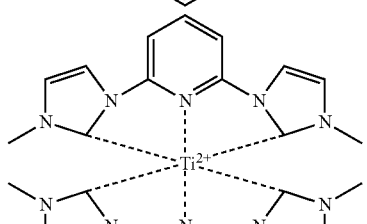

6. The electrolyte of claim 1, wherein the metal-ligand coordination compound undergoes a reversible oxidation/reduction reaction.

7. The electrolyte of claim 1, wherein the metal salt comprises

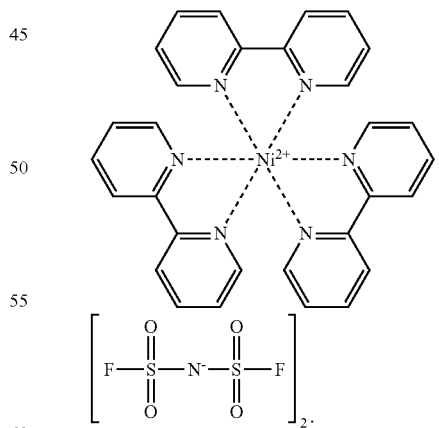

8. The electrolyte of claim 1, wherein the metal salt has a concentration in the range of about 1.2 M to about 5.0 M.

9. The electrolyte of claim 1, wherein the non-aqueous solvent comprises at least one selected from the group consisting of dimethylacetamide, diethyl carbonate, dimethyl carbonate, acetonitrile, γ-butyrolactone (GBL), propylene carbonate (PC), ethylene carbonate (EC), N-methyl-2-pyrrolidone (NMP), fluoro ethylene carbonate, and N,N-dimethylacetamide.

10. The electrolyte of claim 1, wherein the supporting electrolyte comprises at least one selected from the group consisting of $LiBF_4$, $LiPF_6$, $LiClO_4$, $LiCF_3SO_3$, $Li(CF_3SO_2)_2N$, tetraethylammonium tetrafluoroborate ($TEABF_4$), tetrabutylammonium tetrafluoroborate ($TBABF_4$), $NaBF_4$, $NaPF_6$, trimethylsulfonylchloride, and $(NH_4)_2SO_4$.

11. A redox flow battery comprising:
a cathode cell comprising a cathode and a catholyte;
an anode cell comprising an anode and an anolyte; and
an ion exchange membrane disposed between the cathode cell and the anode cell,
wherein at least one of the catholyte and the anolyte comprises the electrolyte of claim 1.

12. The redox flow battery of claim 11, further comprising a catholyte tank and an anolyte tank respectively connected to the cathode cell and the anode cell to transfer fluid.

13. The redox flow battery of claim 11, wherein the ion exchange membrane is an anion exchange membrane.

14. The redox flow battery of claim 13, wherein the anion exchange membrane is an anion exchange membrane obtained by aminating a copolymer of styrene-divinylbenzene used as a base by introducing a chloromethyl group, an anion exchange membrane obtained by substituting a copolymer of vinylpyridine-divinyl benzene with quaternary pyridium, or an anion exchange membrane obtained by aminating an aromatic polysulfone copolymer used as a base by introducing a chloromethyl group.

* * * * *